US007255297B2

(12) United States Patent
Saliba (10) Patent No.: US 7,255,297 B2
(45) Date of Patent: Aug. 14, 2007

(54) ADAPTIVE TAPE DRIVE ROLLER GUIDE

(75) Inventor: George A. Saliba, Northborough, MA (US)

(73) Assignee: Quantum Corporation, San Jose, CA (US)

( * ) Notice: Subject to any disclaimer, the term of this patent is extended or adjusted under 35 U.S.C. 154(b) by 381 days.

(21) Appl. No.: 10/861,750

(22) Filed: Jun. 4, 2004

(65) Prior Publication Data

US 2006/0007593 A1 Jan. 12, 2006

(51) Int. Cl.
*B65H 23/24* (2006.01)
(52) U.S. Cl. .................................. 242/346.2; 242/548.4
(58) Field of Classification Search ................ 242/346, 242/346.2, 355, 356, 548.4
See application file for complete search history.

(56) References Cited

U.S. PATENT DOCUMENTS

| | | | |
|---|---|---|---|
| 3,636,277 A * | 1/1972 | Pohler | |
| 4,162,051 A * | 7/1979 | Doby | 242/355 |
| 4,162,774 A | 7/1979 | Bowers | |
| 4,455,001 A | 6/1984 | Schilke et al. | |
| 4,456,160 A | 6/1984 | Schoettle et al. | |
| 5,323,279 A | 6/1994 | Yokomachi et al. | |
| 5,346,155 A | 9/1994 | Alexander et al. | |
| 5,363,256 A | 11/1994 | Kobayashi | |
| 5,414,585 A | 5/1995 | Saliba | |
| 5,823,455 A | 10/1998 | Hable et al. | |
| 6,018,434 A | 1/2000 | Saliba | |
| 6,125,096 A | 9/2000 | Jacobs et al. | |
| 6,246,535 B1 | 6/2001 | Saliba et al. | |
| 6,600,624 B2 | 7/2003 | Cope et al. | |
| 2001/0023885 A1 * | 9/2001 | Fraberger | 242/346.2 |

* cited by examiner

Primary Examiner—William A. Rivera
(74) Attorney, Agent, or Firm—Morrison & Foerster LLP (57) ABSTRACT

Tape drives and methods of operating tape drives are provided. The tape drive may include: a first reel motor for rotating a first reel having a data storage tape medium wound about the first reel; a data transfer head; a second reel motor for rotating a second reel to draw the tape medium from the first reel, across the data transfer head, and onto the second reel; and at least one adaptive bearing for guiding the tape medium between the first reel and the second reel, the adaptive bearing including a roller having a first rotational resistance as the tape medium travels past the adaptive bearing at a first linear velocity and having a second rotational resistance greater than the first rotational resistance when the tape medium travels past the adaptive bearing at a second linear velocity greater than the first linear velocity. The method may include: drawing a data storage tape medium across a data transfer head between a first reel and a second reel using a first reel motor and a second reel motor; guiding the tape medium between the first reel and the second reel using at least one roller; adjusting a rotational resistance of the at least one roller to apply a first rotational resistance as the tape medium travels past the roller at a first linear velocity and to apply a second rotational resistance greater than the first rotational resistance when the tape medium travels past the roller at a second linear velocity greater than the first linear velocity.

22 Claims, 5 Drawing Sheets

ADAPTIVE TAPE DRIVE ROLLER GUIDE

BACKGROUND OF THE INVENTION

Storage subsystems, such as magnetic tape libraries, are widely used for storing information in digital form. These tape subsystems may include a storage subsystem controller for controlling one or more tape drive systems contained within the storage subsystem and for controlling other components of the storage subsystem, such as the tape picker, which is used to select and load tape cartridges into the tape drives. The storage subsystem may be coupled to a host system which transmits I/O requests to the storage subsystem via a host/storage connection.

Each tape drive reads and writes data to the primary storage medium, which can be, for example, a magnetic tape medium contained within a removable magnetic tape cartridge. The magnetic tape medium typically comprises a thin film of magnetic material which stores the data. The tape medium may be moved by the tape drive between a pair of spaced apart reels and past a data transducer to record or read back information. In one type of tape drive system, one of the reels is part of the tape drive while the other reel is part of the removable tape cartridge. For this type of tape drive system, the reel which is a part of the tape drive is commonly referred to as a take-up reel, while the reel which is a part of the tape cartridge is commonly referred to as a cartridge reel.

Figure 1:
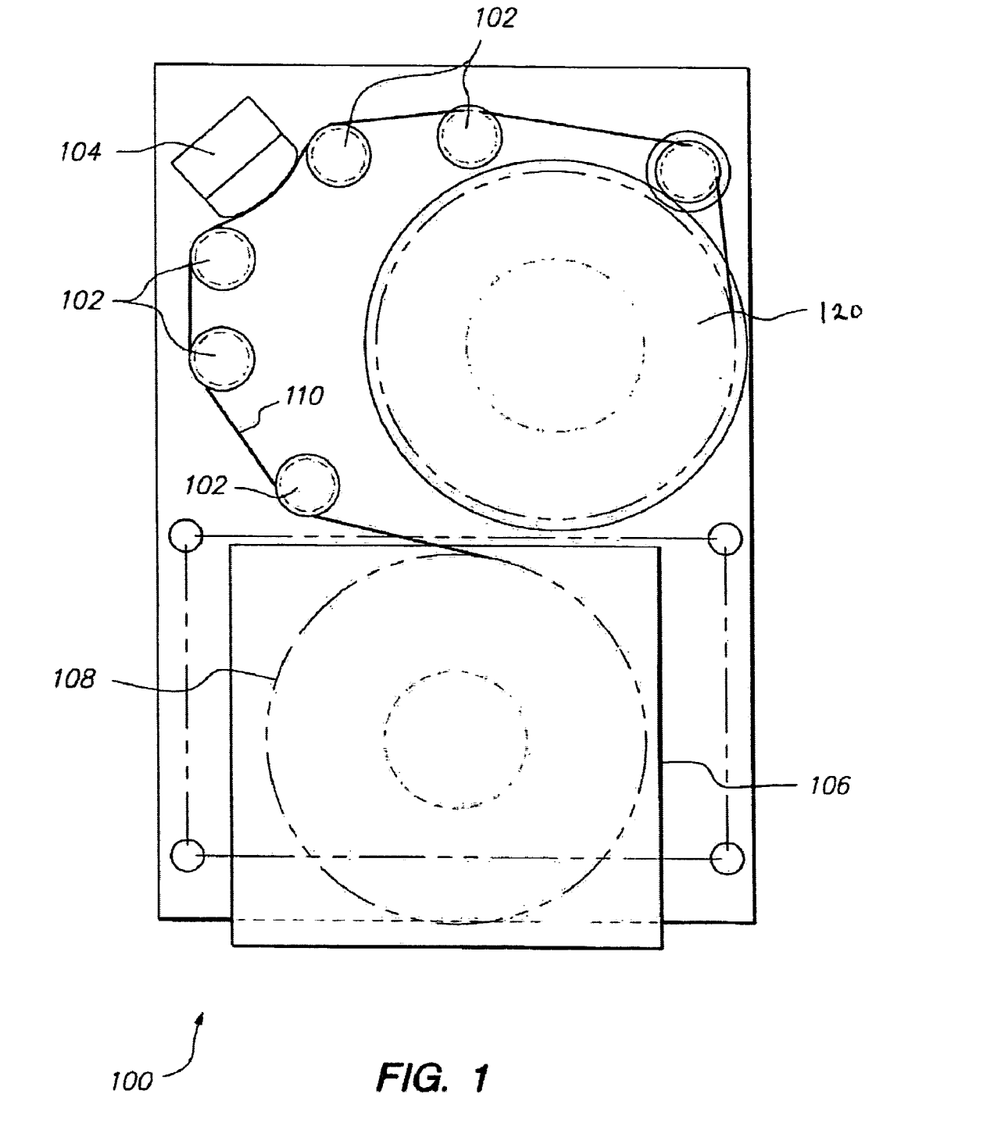
FIG. 1 shows a simplified block diagram of a tape drive system.

An exemplary tape drive system 100 is shown in FIG. 1. This tape drive system 100 uses a removable tape cartridge 106 containing a cartridge reel 108. A storage tape 110 having a thin film of magnetic material which stores data is wound about the cartridge reel 108. The storage tape 110 is moved between a take-up reel 120 and a cartridge reel 108, past one or more head assemblies 104 to record and/or read back information from the storage tape 110. With this system 100, upon insertion of the cartridge 106 into the tape drive 100, the storage tape 110 on the cartridge reel 106 is coupled to the take-up reel 120 of the tape drive 100. Subsequently, prior to removing the tape cartridge 106 from the tape drive 100, the storage tape 110 is rewound onto the cartridge reel 106 and is then uncoupled from the take-up reel 120.

One or more guides may be provided along the tape path to guide the storage tape 110 as it passes between the cartridge reel 108 and the take-up reel 120. In some types of tape drive systems, the guides may comprise stationary guides, which remain stationary as the storage tape 110 passes back and forth. At initial start up, a static frictional force exists between the storage tape 110 and the stationary guide. This static frictional force is overcome by a shear force generated when one of the reel drivers rotates one of the reels 108, 120 to pull the tape 110 across the stationary guide. Once the tape 110 begins moving, a cushion of air may be formed between the tape 110 and the stationary guide, thereby reducing the frictional force between the tape 110 and the guide. However, at initial start-up the shear force applied to overcome the static frictional force can cause damage to the tape 110. Over time, this may result in tape failures or data loss.

In the tape drive system 100 illustrated in FIG. 1, the guides comprise rotating rollers 102. As the storage tape 110 is drawn back and forth across the head assembly 104, the rollers 102 roll with the tape to thereby reduce stress on the storage tape 110. At initial start-up, a static frictional force again exists between the roller 102 and the tape 110. However, as the tape 110 begins moving, the roller 102 rotates with the tape, thereby reducing the shear stress on the tape media.

In operation, rollers 102 may introduce noise in the tape drive system 100, which may result in unpredictable positioning errors of the tape 110. Irregularities in the bearings, machining, and assembly can cause axial and radial runout of the roller 102. As the speed of the tape 110 increases, the amount of noise generated by the rollers 102 may increase as well, thus placing more demand on the head assembly positioning servo control system to accurately follow the data tracks on the tape 110.

As the desire for storage capacity for these tape cartridges 106 increases, it has also become desirable to increase the density of data stored and increase the data transfer from and into on the tape medium, to increase the linear tape velocity, and to decrease the thickness of the tape substrate. As a result, guiding the tape 110 past the head assembly 104 along an accurate invariant linear path has become increasingly difficult. One error phenomena is known as "lateral tape motion" or "LTM." LTM is a major source of tracking errors in linear tape recording. Lateral motion is movement of the tape in a direction orthogonal to primary direction of the tape path. One approach to minimizing LTM tracking errors is to provide a multi-roller tape guide structure, such as the type described in commonly assigned U.S. Pat. No. 5,414,585, to Saliba, entitled, "Rotating Tape Edge Guide", the disclosure of which is incorporated herein by reference in its entirety.

Servo mechanisms have also been used to prevent errors arising from LTM. An optical servo mechanism can be employed to track and monitor lateral motion of a magnetic tape relative to a head assembly 104. In response to detected lateral movements of the tape 110, the head assembly 104 can be actively positioned so as to maintain proper tracking. To this end, the magnetic tape 110 can be provided with an optically detectable servo track that can be detected by an optical pick up head that projects a beam of light onto the servo track and detects light reflected back from the servo track. The track position information from the servo track may be fed into a servo control loop that keeps the head assembly properly positioned. Through the use of a head-positioning actuator and closed-loop servo control algorithms, the servo system is able to position the head over track center, even as the tape is wandering through the tape path.

Unfortunately, in order to increase the transfer of data, the tape must be moved faster and a problem arises when the frequency of the lateral tape movement approaches or exceeds the frequency of the servo control loop, thereby limiting the total capacity of the cartridge. At this point, the servo mechanism may not be capable of maintaining proper positioning of the head assembly 104, resulting in tracking errors.

BRIEF SUMMARY OF THE INVENTION

In accordance with embodiments of the present invention, a tape drive is provided, comprising: a first reel motor for rotating a first reel having a data storage tape medium wound about the first reel; a data transfer head; a second reel motor for rotating a second reel to draw the tape medium from the first reel, across the data transfer head, and onto the second reel; and at least one adaptive bearing for guiding the tape medium between the first reel and the second reel, the adaptive bearing comprising a roller having a first rotational resistance as the tape medium travels past the adaptive bearing at a first linear velocity and having a second rotational resistance greater than the first rotational resistance when the tape medium travels past the adaptive bearing at a second linear velocity greater than the first linear velocity.

In accordance with embodiments of the present invention, a method of operating a tape drive is provided, comprising: drawing a data storage tape medium across a data transfer head between a first reel and a second reel using a first reel motor and a second reel motor; guiding the tape medium between the first reel and the second reel using at least one roller; adjusting a rotational resistance of the at least one roller to apply a first rotational resistance as the tape medium travels past the roller at a first linear velocity and to apply a second rotational resistance greater than the first rotational resistance when the tape medium travels past the roller at a second linear velocity greater than the first linear velocity.

In accordance with embodiments of the present invention, a tape drive is provided, comprising: a first reel motor for rotating a first reel having a data storage tape medium wound about the first reel; a data transfer head; a second reel motor for rotating a second reel to draw the tape medium from the first reel, across the data transfer head, and onto the second reel; at least one roller for guiding the tape medium between the first reel and the second reel; and a means for adjusting a rotational resistance of the roller such that the roller has a first rotational resistance as the tape medium travels past the roller at a first linear velocity and a second rotational resistance greater than the first rotational resistance when the tape medium travels past the roller at a second linear velocity greater than the first linear velocity.

In accordance with embodiments of the present invention, a tape drive is provided, comprising: a first reel motor for rotating a first reel having a data storage tape medium wound about the first reel; a data transfer head; a second reel motor for rotating a second reel to draw the tape medium from the first reel, across the data transfer head, and onto the second reel; and at least one adaptive bearing for guiding the tape medium between the first reel and the second reel, wherein during operation while the tape medium is being drawn across the data transfer head at a first linear velocity and the data transfer head is reading data from or writing data to the tape medium, the adaptive bearing rotates at a rotational velocity corresponding to a non-zero linear velocity that is less than the first linear velocity.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

DETAILED DESCRIPTION

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Figure 2:
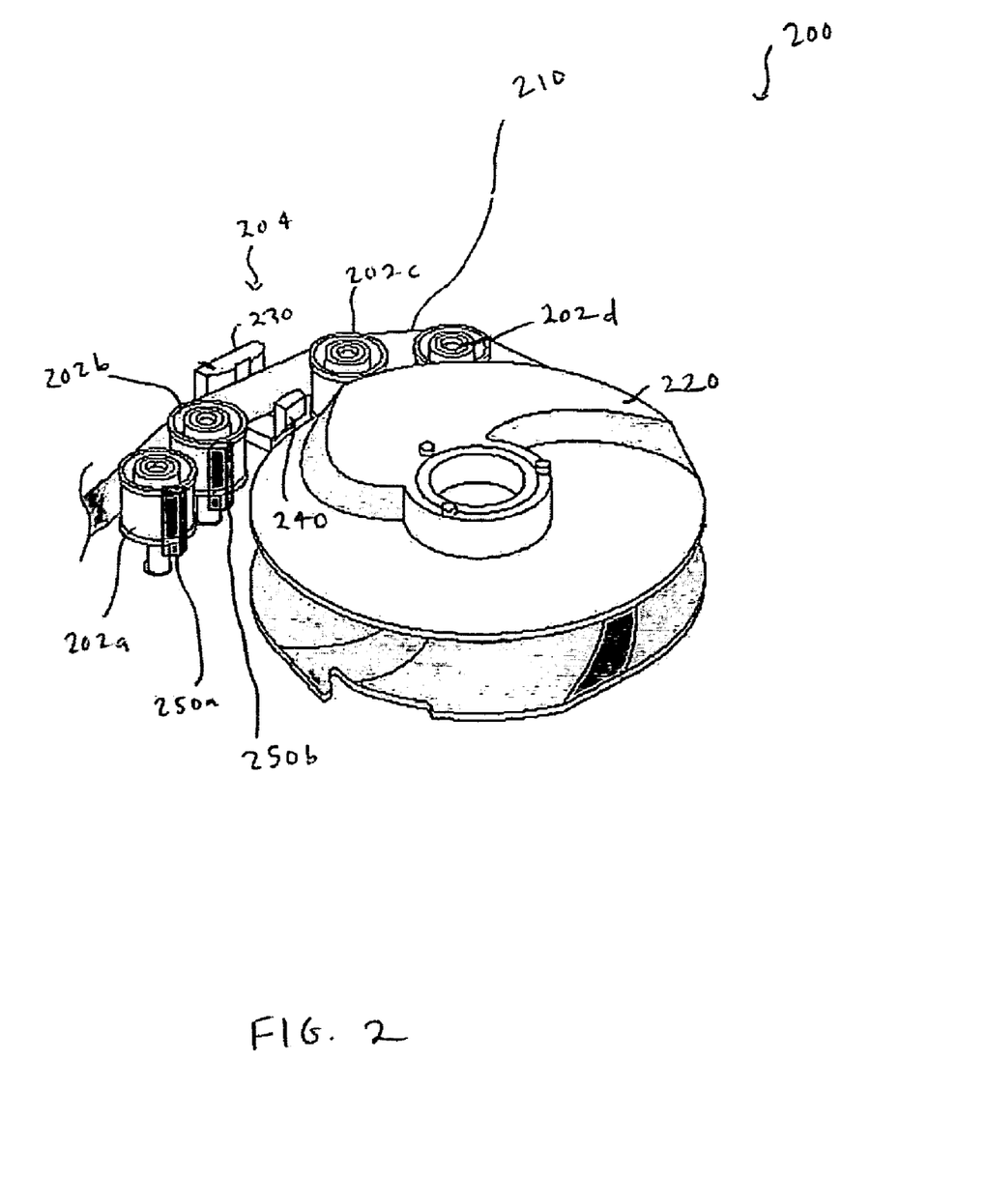
FIG. 2 shows a perspective view of a tape drive system in accordance with embodiments of the present invention.

FIG. 2 shows a perspective view of a portion of a tape drive system 200, in accordance with embodiments of the present invention. A take-up reel 220 having a storage tape 210 partially wound about the take-up reel 220 is shown. During operation, the storage tape 210 travels along a tape path which takes the storage tape 210 past several rollers (rollers 202a-202d are shown; other rollers not shown may also be used) and past the head assembly 204. In this embodiment, the head assembly 204 comprises a data transfer head 230, which is positioned adjacent to a data storage side of the storage tape 210, and a servo detector 240, which is positioned adjacent a servo side of the storage tape 210. The storage tape 210 comprises a data storage side and an opposing servo side. The servo side of the tape comprises an indicator which is detected by the servo detector 240. This information is used to adjust the positioning of the data transfer head 230 in response to lateral tape motion. As described above, this servo detector 240 may comprise an optical servo detector which optically detects a marking (such as, e.g., a line, dot, or pattern of dots) having a known position relative to the tracks of data on the data storage side. By detecting the position of the servo marking as the storage tape 210 streams past the head assembly 204, the position of the data transfer head 230 can be adjusted to maintain a proper alignment with the tracks of data.

As described above, when conventional rollers are used in tape drive systems, damage to the storage tape 210 due to shear forces caused by the guides can be reduced because the rolling guides roll as the storage tape 210 begins to pull away from the guide, thereby reducing damage caused by stiction. Unfortunately, the rotation of these rollers, particularly at high speeds, may introduce noise and lateral tape motion in the tape drive system as it rotates, which may result in unpredictable positioning errors of the tape 110.

In accordance with some embodiments, one or more rollers 202 may be configured to have a first rotational resistance at low rotational velocities and a higher rotational resistance at higher speeds. Therefore, at start-up and at low linear tape speeds, very little rotational resistance is applied, thereby allowing the rollers 202 to rotate freely. This can help to reduce the stress on the tape 210 at start-up. At high tape speeds, the static forces between the tape and the rollers are negligible, while the noise introduced by rollers rotating at high speed becomes more significant. Therefore, at high tape speeds, an increased rotational resistance is applied to the rollers 202, thereby reducing the rotational velocity of the rollers 202 and, in turn, reducing the noise associated with increased roller speed.

This variable resistance can be accomplished, for example, by positioning one or more magnetic members 250 adjacent to each roller 202. In FIG. 2, two magnetic members 250a-250b are shown. These magnetic members 250 may establish an eddy current brake on the roller 202, which would provide a variable rotational resistance depending on the rotational velocity of the roller 202. This variable rotational resistance would increase as the rotational velocity of the roller 202 increases. The magnetic members 250 may comprise, for example, a block of magnetic material or an electromagnet. The rollers 202 may be, for example, coated with any conductive, non-magnetic material, such as aluminum, an aluminum alloy, or nickel.

An eddy current is a swirling current produced in a conductive material in response to a changing magnetic field. When a magnetic material is positioned adjacent to a conductive roller, rotation of the roller produces eddy currents in the roller. These eddy currents oppose the rotation of the roller, thereby creating a non-contact braking force on the roller. In addition, as the rotational velocity of the roller increases, the braking force generated by the eddy current increases as well.

The strength of the eddy current field may be adjusted by varying the gap between the roller 202 and the magnetic member 250, and may also be adjusted by varying the magnetic strength of the magnetic member 250 or the composition of the roller 202. Thus, in various embodiments, the strength of the eddy current can be tuned to control the roller speed profile as desired. For example, the roller speed profile may be tuned such that at low linear tape speeds (which result in low roller rotational velocities), the magnetic members 250 produce very little rotational resistance, while at high tape speeds (such as, e.g., the full tape speed during recording), the magnetic members 250 produce high rotational resistance.

Figure 3:
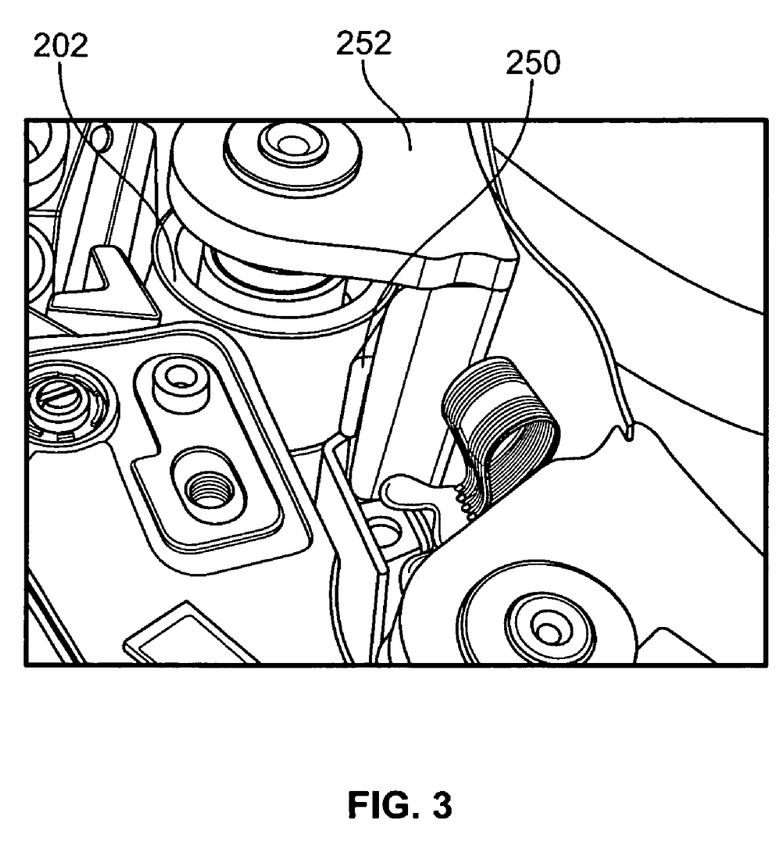
FIG. 3 shows a perspective view of an adaptive bearing in accordance with embodiments of the present invention.

FIG. 3 is a perspective view of a roller 202, rotatably mounted onto a support bracket 252, in accordance with embodiments of the present invention. In the illustrated embodiment, the magnetic member 250 is mounted onto an interior surface of the support bracket 252 closely adjacent to but not in contact with the outer surface of the roller 202. When the roller 202 is static, the magnetic member 250 does not induce a changing magnetic field in the roller 202. Other forces, such as inertia and friction between the roller 202 and the support bracket 252 may cause some rotational resistance, but when the roller 202 is not moving, the magnetic member 250 does not contribute to the overall rotational resistance. The illustrated arrangement may be particularly desirable in some embodiments because of the ease with which existing roller assembly designs can be modified to incorporate the eddy current brake. In some cases, the only significant modifications are the mounting of the magnetic member 250 onto the existing support bracket 252 and the tuning of the magnetic force provided by the magnetic member 250 to provide the desired braking force.

When the tape 210 begins moving, the friction between the tape 210 and the roller 202 causes the roller to begin rotating with the moving tape 210. As the rotational velocity of the roller 202 increases, the strength of the eddy current induced by the magnetic member 250 increases as a result of the increasing rotational speed of the roller 202, thereby increasing the rotational resistance of the roller 202. This increased rotational resistance operates to restrain the velocity of the roller 202. As the tape 210 reaches higher linear velocities, a cushion of air begins to form between the tape 210 and the roller 202. This cushion of air reduces the force applied by the tape 210 onto the roller 202, which also serves to reduce the rotational velocity of the roller 202.

Figure 4:
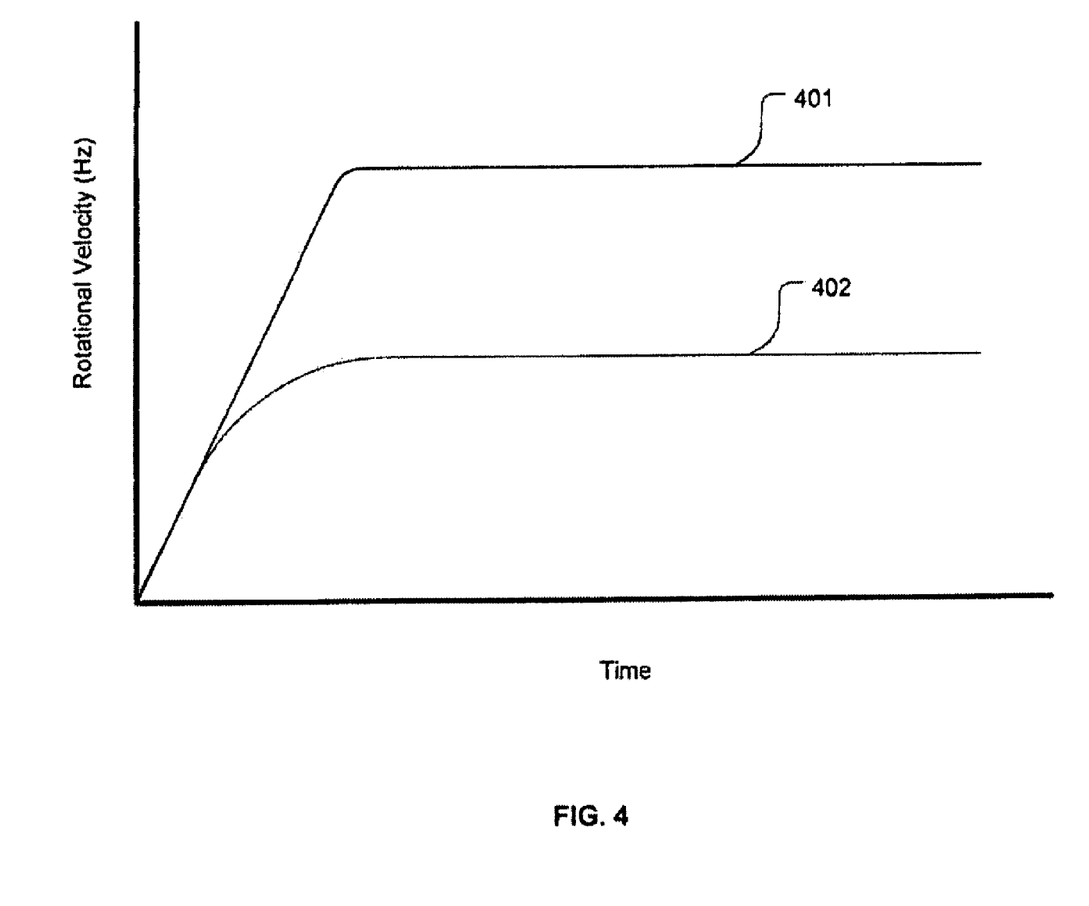
FIG. 4 is a chart illustrating the rotational speeds of a conventional roller and a roller having an eddy current brake, in accordance with embodiments of the present invention.

FIG. 4 is a chart illustrating the rotational speeds of a conventional roller and a roller having an eddy current brake, in accordance with embodiments of the present invention. Here, the x-axis corresponds to the elapsed time from when the tape begins moving, and the y-axis corresponds to the rotational velocity of the roller in hertz. Line 401 corresponds to the conventional roller and line 402 corresponds to a roller having an eddy current brake. It can be seen that as time passes and the linear tape velocity gradually increases, the rotational velocity of the conventional roller increases with the linear tape velocity. Once the tape reaches the maximum velocity corresponding to the desired tape speed (e.g., 400 in/sec) and maintains that velocity, the rotational velocity of the roller remains constant (as indicated by the plateau of line 401). In contrast, the rotational velocity of the roller having an eddy current brake increases at nearly the same rate as the conventional roller at the beginning of tape movement, but as the linear tape velocity continues to increase, the rotational velocity increases until the two forces balance. At maximum tape speed, the rotational velocity reaches an approximately steady rotational velocity much lower than the rotational velocity of the conventional roller.

Figure 5:
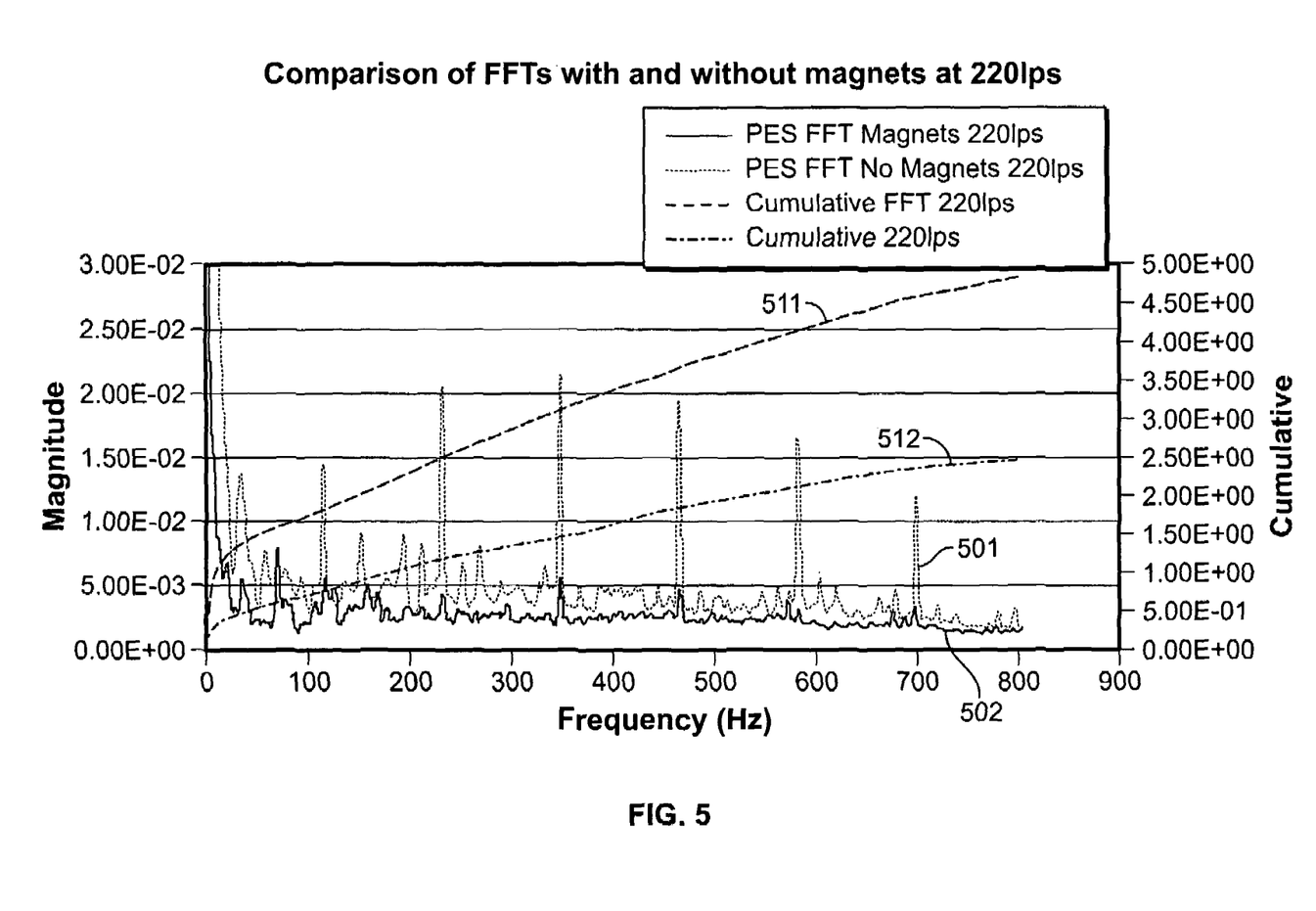
FIG. 5 is a chart illustrating the high amplitude peaks at harmonics of the roller rotation frequency.

FIG. 5 is a chart illustrating the high amplitude peaks at harmonics of the roller rotation frequency up to several hundred hertz. Line 501 corresponds to a conventional roller and line 502 corresponds to a roller having an eddy current brake. The high amplitude peaks of line 501 place a large demand on the servo system to effectively track the moving tape as it passes by the head assembly 204. In contrast, when a magnet is used to reduce the rotational velocity of the roller, as described above, line 502 is achieved having much lower peaks. The cumulative effect of the reduced peaks is seen in the superimposed chart, where line 511 corresponds to the conventional roller and line 512 corresponds to the roller having an eddy current brake. As shown by FIG. 5, the use of the eddy current brake may result in a tracking error improvement of 37%. In some embodiments, in order to ensure that the servo system is capable of compensating for LTM during operation, the eddy current brake is configured to maintain the rotational frequency governed and selected by the designer where the rollers' contributions to the lateral motion are at a level that could be sufficiently corrected by the operational frequency of the servo system. In some embodiments, the eddy current brake is configured to maintain the rotational frequency of the rollers at a level less than one third the maximum operational frequency of the servo system.

In the embodiment described above, the tape drive system 200 includes a take-up reel 220 that is driven by a take-up reel motor. A removable cartridge containing a cartridge reel is inserted into the tape drive system 200 and the cartridge reel is rotated by a supply motor. During operation, the take-up reel motor and the supply motor alternate in driving the movement of the tape. When the take-up reel motor is powering the rotation of the take-up reel 220 to draw the tape 210 from the tape cartridge, the tape 210 travels in a first direction across the head assembly 204. In order to maintain a desired level of tension in the tape 210 as the tape 210 passes from the cartridge reel to the take-up reel, the supply motor can provide a drag on the cartridge reel. Similarly, when the supply motor drives the cartridge reel to retrieve the tape 210 from the take-up reel 220, the take-up reel motor can provide a drag on the take-up reel 220 to create the desired tape tension. Thus, the rollers 202 serve to guide the tape 210 as it travels along the tape path, and it is desirable to minimize the amount of drag caused by the rollers 202. In contrast, in some prior art systems, the motors are not configured to supply the desired drag. Thus, the rollers in these prior art systems are configured to supply a drag on the tape so as to create tension across the data transfer head.

In the embodiments described above, the rollers having a variable rotational resistance are configured so as to continue rotating, even after the eddy current brake balances the rotational forces with the increasing the rotational resistance. Therefore, during operation, a viscous contact between the tape and the roller is maintained. The only time that the roller stops rotating is when the tape 210 stops moving or changes direction, which would result in the roller changing its direction of rotation as well. An advantage that may be achieved by maintaining some rotation of the roller at all times while the tape is streaming past the roller is that tape and roller guide damage may be reduced. This is because when the tape slows down, the air layer formed between the tape and the roller begins to reduce. If the roller is stationary, then at a certain point in the reduction of the air layer, the moving tape will come in contact with a static roller, causing a dramatic increase in shear stress in the tape and roller. In contrast, if the roller maintains some rotation as the tape slows down, the shear stress caused by the contact between the slowing tape and the roller will be reduced because both the tape and the roller will be moving in the same direction, thereby reducing the velocity differential between the tape and the roller at the time of contact. Maintaining this rotation of the rollers during operation may be particularly important when the tape surface and roller surface have a high roughness, which would exacerbate the shear stresses caused when a moving tape lands on a static roller.

In accordance with embodiments of the present invention, a tape drive system having guides that provide the advantages of rotating roller guides at low tape speeds and some of the important benefits of stationary guides at high tape speeds, such as lower lateral motion at high frequencies is provided.

While the invention has been described in terms of particular embodiments and illustrative figures, those of ordinary skill in the art will recognize that the invention is not limited to the embodiments or figures described. For example, in some of the embodiments described above, the eddy current brake is created by mounting a magnetic material adjacent to the roller surface. In other embodiments, the variable rotational resistance can be provided using other methods. For example, an electromagnet could be provided adjacent the rotating roller. In this case, the magnetic field can be adjusted electronically, as desired. In addition, the roller could be made of a magnetic material, and the magnetic field created by the electromagnet could be actively adjusted during operation to provide the desired level of rotational resistance. In other embodiments, use of a conventional magnetic material may be desirable because of reduced cost and complexity.

The figures provided are merely representational and may not be drawn to scale. Certain proportions thereof may be exaggerated, while others may be minimized. The figures are intended to illustrate various implementations of the invention that can be understood and appropriately carried out by those of ordinary skill in the art.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A tape drive, comprising:
   a first reel motor for rotating a first reel having a data storage tape medium wound about the first reel;
   a data transfer head;
   a second reel motor for rotating a second reel to draw the tape medium from the first reel, across the data transfer head, and onto the second reel; and
   at least one adaptive bearing for guiding the tape medium between the first reel and the second reel, the adaptive bearing comprising a roller having a first rotational resistance as the tape medium travels past the adaptive bearing at a first linear velocity and having a second rotational resistance greater than the first rotational resistance when the tape medium travels past the adaptive bearing at a second linear velocity greater than the first linear velocity.

2. The tape drive of claim 1, wherein:
   the adaptive bearing comprises an eddy current brake.

3. The tape drive of claim 1, wherein:
   the roller comprises an electrically-conductive material; and
   the adaptive bearing comprises a magnetic member positioned adjacent the roller.

4. The tape drive of claim 1, wherein:
   the adaptive bearing comprises an electromagnet positioned adjacent the roller.

5. The tape drive of claim 1, wherein:
   the adaptive bearing has a non-zero rotational velocity when the tape medium has a linear velocity corresponding to the recording speed of the tape.

6. The tape drive of claim 1, wherein:
   the adaptive bearing comprises a tape edge-guiding bearing.

7. The tape drive of claim 1, wherein:
   the first reel motor is for rotating the first reel disposed in a removable data storage cartridge containing the data storage tape medium; and
   the first reel comprises a supply reel and the second reel comprises a take-up reel.

8. The tape drive of claim 1, further comprising:
   a servo system for adjusting a position of the data transfer head in response to lateral movement of the tape medium, the servo system having a maximum operational frequency;
   wherein the adaptive bearing maintains a rotational frequency of the roller to less than the maximum operational frequency of the servo system at all times during operation of the tape drive.

9. The tape drive of claim 8, wherein:
   wherein the adaptive bearing maintains a rotational frequency of the roller less than one third of the maximum operational frequency of the servo system.

10. A method of operating a tape drive, comprising:
    drawing a data storage tape medium across a data transfer head between a first reel and a second reel using a first reel motor and a second reel motor;
    guiding the tape medium between the first reel and the second reel using at least one roller;
    adjusting a rotational resistance of the at least one roller to apply a first rotational resistance as the tape medium travels past the roller at a first linear velocity and to apply a second rotational resistance greater than the first rotational resistance when the tape medium travels past the roller at a second linear velocity greater than the first linear velocity.

11. The method of claim 10, further comprising:
reading or writing data to the data storage tape medium while drawing the data storage tape medium at the second linear velocity and maintaining a rotational velocity of the at least one roller such that the rotational velocity corresponds to a non-zero linear velocity less than the second linear velocity.

12. The method of claim 11, wherein:
the rotational velocity of the at least one roller corresponds to a non-zero linear velocity less than approximately half the second linear velocity.

13. The method of claim 10, wherein:
the adjusting the rotational resistance of the at least one roller comprises subjecting the roller to a magnetic field.

14. The method of claim 13, further comprising:
operating a servo system to compensate for lateral tape motion, the servo system having a maximum operational frequency; and
adjusting the rotational resistance of the at least one roller to maintain a rotational frequency of the roller less than the maximum operational frequency of the servo system at all times during operation of the tape drive.

15. The method of claim 13, further comprising:
operating a servo system to compensate for lateral tape motion, the servo system having a maximum operational frequency; and
adjusting the rotational resistance of the at least one roller to maintain a rotational frequency of the roller less than one third of the maximum operational frequency of the servo system at all times during operation of the tape drive.

16. A tape drive, comprising:
a first reel motor for rotating a first reel having a data storage tape medium wound about the first reel;
a data transfer head;
a second reel motor for rotating a second reel to draw the tape medium from the first reel, across the data transfer head, and onto the second reel;
at least one roller for guiding the tape medium between the first reel and the second reel; and
a means for adjusting a rotational resistance of the roller such that the roller has a first rotational resistance as the tape medium travels past the roller at a first linear velocity and a second rotational resistance greater than the first rotational resistance when the tape medium travels past the roller at a second linear velocity greater than the first linear velocity.

17. The tape drive of claim 16, wherein:
the first reel motor is for rotating the first reel disposed in a removable data storage cartridge containing the data storage tape medium; and
the first reel comprises a supply reel and the second reel comprises a take-up reel.

18. The tape drive of claim 16, further comprising:
a servo system for adjusting a position of the data transfer head in response to lateral movement of the tape medium, the servo system having a maximum operational frequency;
wherein the means for adjusting maintains a rotational frequency of the roller to less than the maximum operational frequency of the servo system at all times during operation of the tape drive.

19. The tape drive of claim 18, wherein:
wherein the means for adjusting maintains a rotational frequency of the roller less than one third of the maximum operational frequency of the servo system.

20. A tape drive, comprising:
a first reel motor for rotating a first reel having a data storage tape medium wound about the first reel;
a data transfer head;
a second reel motor for rotating a second reel to draw the tape medium from the first reel, across the data transfer head, and onto the second reel; and
at least one adaptive bearing for guiding the tape medium between the first reel and the second reel, wherein during operation while the tape medium is being drawn across the data transfer head at a first linear velocity and the data transfer head is reading data from or writing data to the tape medium, the adaptive bearing rotates at a rotational velocity corresponding to a non-zero linear velocity that is less than the first linear velocity.

21. The tape drive of claim 20, wherein:
the rotational velocity of the at least one adaptive bearing corresponds to a non-zero linear velocity less than approximately half the first linear velocity.

22. The tape drive of claim 20, wherein:
the at least one adaptive bearing further comprises a roller and a magnetic member adjacent to the roller, the magnetic member subjecting the roller to a magnetic field to reduce the rotational velocity of the roller.

* * * * *